(12) United States Patent
Frangeul

(10) Patent No.: US 11,926,478 B1
(45) Date of Patent: Mar. 12, 2024

(54) CONVEYOR ARRANGEMENT

(71) Applicant: INTERROLL HOLDING AG, Sant'Antonino (CH)

(72) Inventor: Xavier Frangeul, La Roche-sur-Yon (FR)

(73) Assignee: INTERROLL HOLDING AG, Sant'Antonino (CH)

(*) Notice: Subject to any disclaimer, the term of this patent is extended or adjusted under 35 U.S.C. 154(b) by 0 days.

(21) Appl. No.: 18/552,646

(22) PCT Filed: Apr. 8, 2022

(86) PCT No.: PCT/EP2022/059434
§ 371 (c)(1),
(2) Date: Sep. 26, 2023

(87) PCT Pub. No.: WO2022/214659
PCT Pub. Date: Oct. 13, 2022

(30) Foreign Application Priority Data

Apr. 7, 2021 (EP) .................................. 21167145

(51) Int. Cl.
*B65G 13/071* (2006.01)
*B65G 43/08* (2006.01)
(Continued)

(52) U.S. Cl.
CPC ........... *B65G 13/071* (2013.01); *B65G 43/08* (2013.01); *B65G 47/52* (2013.01); *B65G 67/24* (2013.01)

(58) Field of Classification Search
CPC ........ B65G 67/24; B65G 47/52; B65G 43/08; B65G 13/071
(Continued)

(56) References Cited

U.S. PATENT DOCUMENTS 4,944,357 A 7/1990 Wible et al.
10,124,958 B2 * 11/2018 Robbin ................. B65G 35/06
(Continued)

FOREIGN PATENT DOCUMENTS

CN 108657837 A 10/2018
JP H08268538 A 10/1996

OTHER PUBLICATIONS

EP0582962 (Year: 1994).*
(Continued)

*Primary Examiner* — Gene O Crawford
*Assistant Examiner* — Lester Rushin, III
(74) *Attorney, Agent, or Firm* — Wagenknecht IP Law Group PC

(57) ABSTRACT

Conveyor arrangement including a first conveying section having first rollers, a second conveying section having second rollers, the second conveying section being arranged adjacent to the first conveying section, so that an object can be transferred between the conveying section by rolling along the first and second rollers, a mobile drive movable along different positions along the first conveying section and adapted to temporarily provide a drive power to a selected first roller depending on the position of the movable drive; wherein the movable drive is prevented to get into the second conveying section, characterized in that the conveying arrangement comprises a drive line for providing a drive power at least indirectly from the movable drive to the second rollers when the movable drive is located at a, in particular first end position, in the first conveying section adjacent to the second conveying section.

10 Claims, 3 Drawing Sheets

(51) Int. Cl.
*B65G 47/52* (2006.01)
*B65G 67/24* (2006.01)

(58) Field of Classification Search
USPC .................................... 198/781.01, 781.03
See application file for complete search history.

(56) References Cited

U.S. PATENT DOCUMENTS

| | | | | |
|---|---|---|---|---|
| 10,518,978 | B2 * | 12/2019 | Vogt | B05B 13/0278 |
| 11,008,169 | B2 * | 5/2021 | Dudek | B65G 13/071 |
| 2019/0276238 | A1 | 9/2019 | Dudek et al. | |

OTHER PUBLICATIONS

CN114364623 (Year: 2022).*
WO2020008430 (Year: 2020).*
EP3539905 (Year: 2019).*
International Search Report for PCT/EP2022/059434 dated Jul. 20, 2022.
Written Opinion for PCT/EP2022/059434 dated Jul. 20, 2022.

* cited by examiner a)

b)

c)

d)

CONVEYOR ARRANGEMENT

TECHNICAL FIELD

The invention refers to a conveyor arrangement.

BACKGROUND OF THE INVENTION

US 2019/0276238 A1 discloses a movable drive for driving a rollers in a roller conveyor. The mobile drive comprises a main body, a first drive motor to drive the mobile drive between different position along the conveyor. a roller driving device mounted to the chassis frame. A conveyor drive is attached to an upper side of the main body. The conveyor drive is adapted to be mechanically coupled to one or a plurality of rollers of the roller conveyor. A second drive motor of the movable drive provides drive power for the conveyor drive and consequently provides the drive power to the rollers of the roller conveyor. The conveyor drive can get into direct contact of the rollers so as to bring the rollers in rotational movement. The movable drive is moving synchronously with a pallet to be conveyed along the direction of travel. The movable motor is powered by a battery located within the movable drive. So there is no need for complex wiring along all the entire roller conveyor.

In certain embodiments there may be spatial limitations in particular in a terminal area where the objects are transferred from/and to form outside of the roller conveyor. Here the movable drive cannot get in to contact with the rollers. Nevertheless the rollers in the terminal area needs also to be driven.

BRIEF SUMMARY OF THE INVENTION

The invention is directed to a conveyor arrangement and a method for loading an object using a conveyor arrangement. The conveyor arrangement includes first and second conveying sections having rollers on which an object can be conveyed, the second conveying section being arranged adjacent to the first conveying section so that the object can be transferred between the conveying sections by rolling along the rollers; a mobile drive that is movable along different positions along the first conveying section and adapted to temporarily provide drive power to a selected first roller depending on the position of the movable drive in particular by immediate contact with the movable drive and the first roller; wherein the movable drive is prevented from getting in the second conveying section, in particular the movable drive is prevented from getting in immediate contact with the second rollers (22b) for driving the second rollers. The conveying arrangement includes a drive line for providing a drive power at least indirectly from the movable drive to the second rollers when the movable drive is located at a, in particular first end position, in the first conveying section adjacent to the second conveying section. The mobile drive is in particular enabled to move along the first conveying section, but is hindered to move into the second conveying section. The second conveying section is in particular a terminal in which an external vehicle can load and unload objects to be conveyed.

The invention provides solutions so that the mobile drive is still enabled to provide the drive force to the second conveying section.

The drive power provided by the mobile drive can be a mechanical drive power which can be directly used to drive the rollers in the second conveying section, where it is possible that any mechanical transmissions may be arranged between the mobile drive and the second rollers.

The drive power provided by the mobile drive can be an electrical drive power which is translated by a motor into mechanical drive power to drive the second rollers. In this case the actuator may be fixedly located separate to the mobile drive.

Both embodiments enable, that no wiring is to be provided to the second conveying section, since the mobile drive is used to provide the drive power.

In particular when positioned in the accommodation space the lifting platform and/or the vehicle is at least surrounded from three sides by second rollers, when viewed in top view.

The conveyor arrangement is adapted to convey objects having a weight of a least 100 kg, in particular 500 kg, in particular up to 1000 kg. The object may comprise a pallet and/or a container.

BRIEF DESCRIPTION OF THE DRAWINGS

The invention is described in more details with the help of the figures, where.

DETAILED DESCRIPTION

Figure 1:
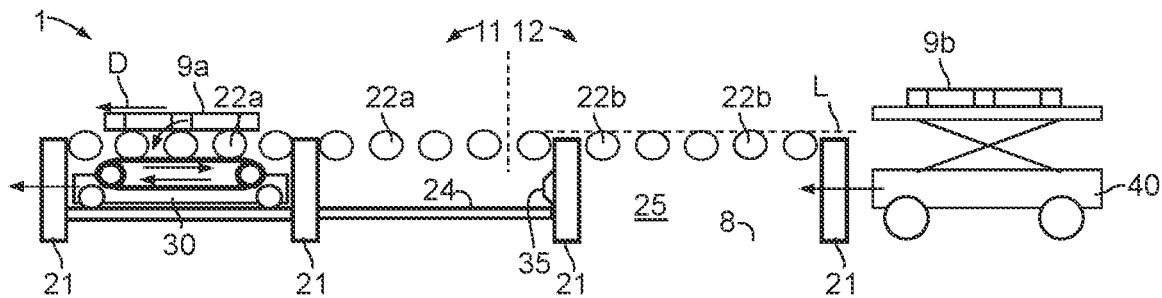
FIG. 1 depicts a conveyor arrangement in different situations during loading a pallet to a conveyor section in side view.
Figure 1:
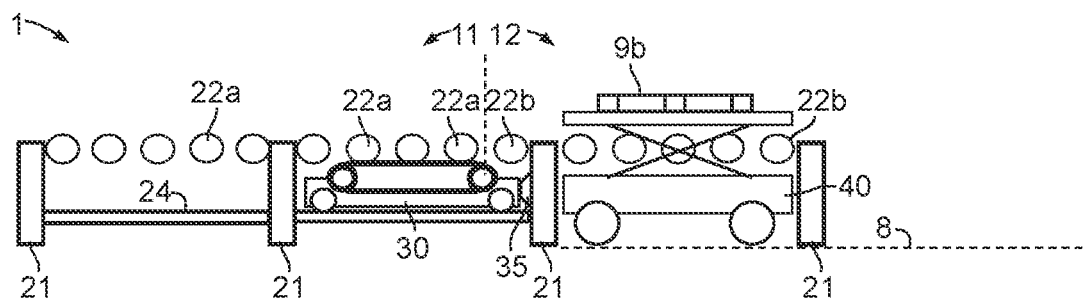
Figure 1:
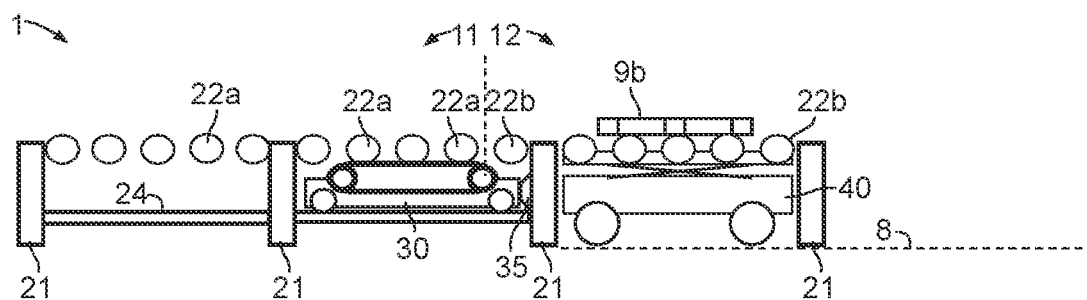
Figure 1:
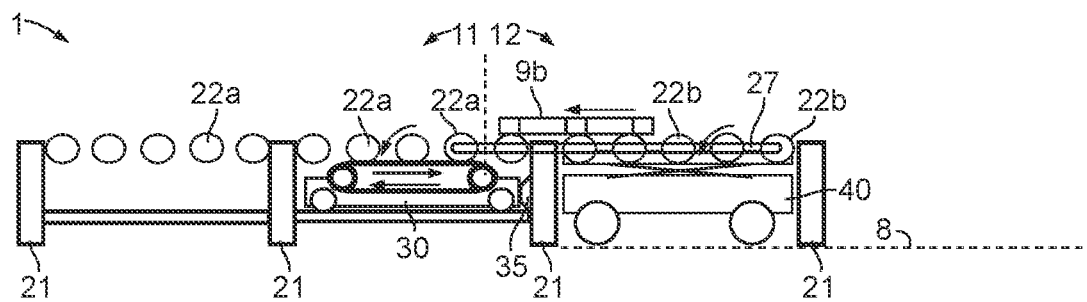
Figure 4:
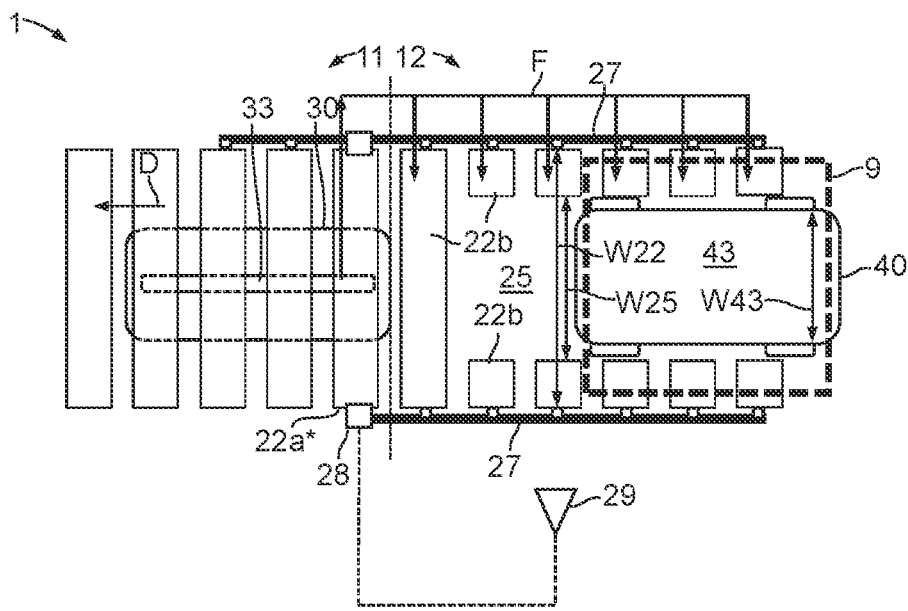
FIG. 4 depicts a first conveying section and a second conveying section of the conveyor arrangement of FIG. 1 in top view.
Figure 5:
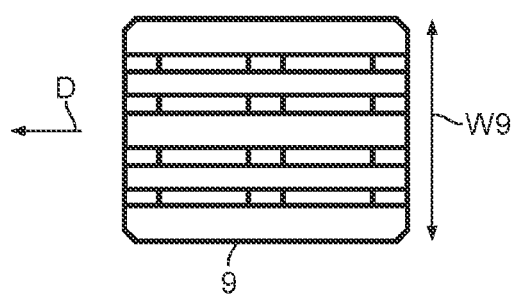
FIG. 5 depicts an exemplary object to be conveyed in form of a pallet in top view.

FIGS. 1 and 4 show an embodiment of the conveyor arrangement 1. The conveyor arrangement 1 is adapted to convey objects 9, such as a pallet and/or a container. The conveyor arrangement 1 is adapted to move the object 9 in conveying sections 11, 12 along a predefined direction D of travel. Therefore, the conveyor arrangement 1 has a plurality of rollers 22 arranged along the direction D of travel. The rollers 22 are supported on a frame 21.

Within a first conveying section 11 at least some of the rollers 22a are idler rollers, which are not driven by a dedicated drive motor. Instead, the first rollers 22a are temporarily connected to a mobile drive 30. The mobile drive 33 is adapted to be moved between different positions of a first conveying section 11. Depending on the position of the mobile drive, the mobile drive 30 can drive at least one of the first rollers 22a which are located next to the mobile drive 30. There is a first end stop 35 provided at the border between the first and the second conveying sections 11, 12 which prevents the mobile drive from driving into the accommodation space 25.

Figure 2:
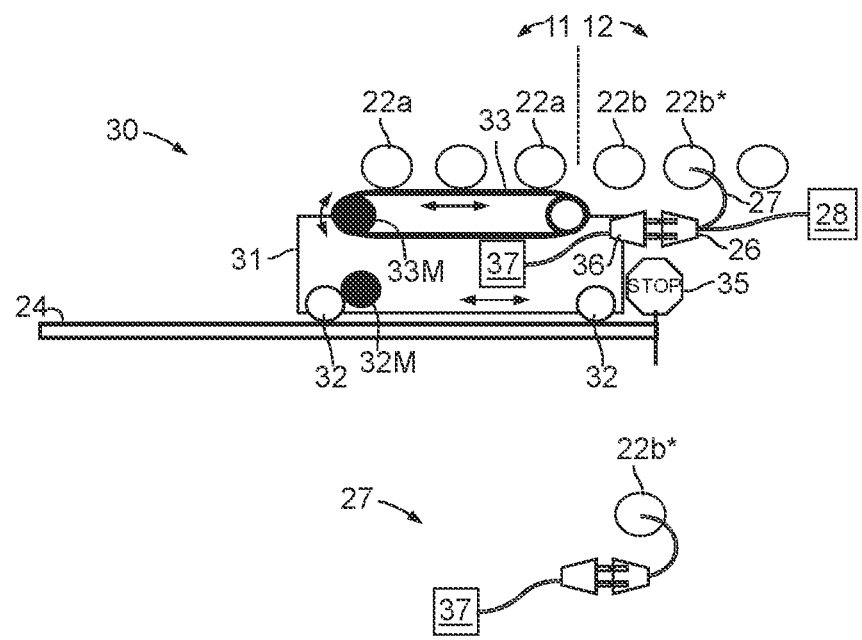
FIG. 2 depicts a mobile drive of the conveyor arrangement of FIG. 1.
Figure 3:
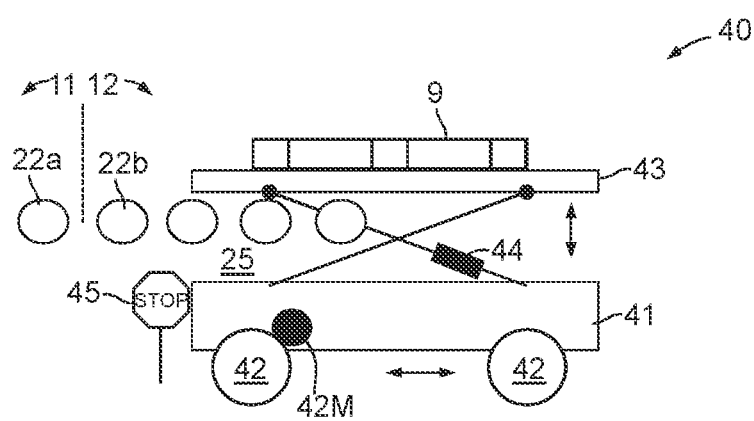
FIG. 3 depicts a transport vehicle of the conveyor arrangement of FIG. 1.

FIG. 2 shows the mobile drive 30 in more detail. The mobile drive 30 has a main body 31. The main body is supported by wheels 32. The wheels allow the man body 31 to be movable along a track 24 parallel to the direction D of travel. A first drive motor 32M provides drive power resulting in a drive motion of the base frame 31 along the track 24. In particular the drive power is provided to at least one of the wheels 32.

The first motor 32M can also provide a brake force enabling the main body 31 to remain stationary even if externally urged along the track 24. Alternatively or combination, the mobile drive 30 can have a parking brake.

The mobile drive has a conveyor drive 33. The conveyor drive is adapted to provide first rollers 22a with a drive power. The drive power is transmitted by a temporary drive connection to a number of first roller 22a, in particular by a temporary frictional connection. The conveyor drive 33 in particular includes a drive belt, which is in temporary frictional engagement with a first roller 22a. The conveyor drive 33 has a second drive motor 33M.

During conveying a first object 9a (FIG. 1, panel a) along the first conveying section 11, the mobile drive 30 is driving synchronously with the first 9a object along the first conveyor section, so that the mobile drive is always located below the object. A number of first rollers 22a are located between the mobile drive 30 and the object. Thereby the conveyor drive 33 drives the first rollers 22a (e.g. in an anti-clockwise direction), leading to a movement of the object (e.g. in leftwards direction).

In an embodiment, it is provided that always three first rollers 22a are in contact with the conveyor drive to enable a reliable transfer of drive power for moving the object 9. In an embodiment, at least one of the first rollers 22a may include a dedicated motor for driving the roller. The dedicated drive is fixedly connected to the respective roller, in particular the roller is a motored roller.

A second conveying section 12 is adjacent to the first conveying section 11. The second conveying section 12 has second conveyor rollers 22b for conveying the object. Both conveying sections are adjacent to each other so that the object can be transferred between both sections 11,12 by just being rolled along the first rollers 22a and the second rollers 22b.

First and second roller together form a continuous roller conveyor along the same direction D of travel.

The second conveying section constitutes an interface where an object 9b from outside the conveying sections can be handed over from and/or to the roller conveying section, e.g. by a forklift and an automated guided vehicle, also often called as an Autonomous Mobile Robot (AMR), or as AGV (in the following merely "vehicle"). The vehicle 40 has a main body 41, which is supported by wheels 42. The vehicle 40 is driven by a vehicle drive motor 42M, which in particular drives at least on the wheels 42. The vehicle 40 has a liftable platform 43, on which the object 9 can be placed. The liftable platform 43 can be raised and lowered by a lifting device 44.

The second conveying section 12 provides an accommodation space 25, in which the 40 vehicle can be parked during transferring the object 9b between the vehicle 40 to the second conveying section 12 (namely from the vehicle 40 to the second conveying section 12 and/or from the second conveying section 12 to the vehicle 40). When the vehicle drives in the accommodation space 25 the lifting platform is lifted in an elevates state, in which the object 9 is above a level of a conveying surface L, spanned by the second rollers 22b (FIG. 1, panel A; FIG. 1, panel b). When the vehicle 40 is parked the lifting platform is lowered, so that the object 9 are placed on the second rollers 22b. The lifting platform 34 submerges under the level L and loses contact to the object (FIG. 1, panel c). The object can now be moved along the direction D of travel on the second rollers 22b.

A second end stop 45 is provided at the end of the accommodation space 25 preventing the vehicle to drive into the area of the first conveying section and to collide with the track 24 or with the mobile drive 30.

As apparent from FIG. 4 at least some of the second rollers 22b are shorter rollers which leaves the accommodation space 25 between them.

A width W25 of the accommodation space 25 is smaller than a conveying width W22.

A width W25 of the accommodation space 25 is smaller than a width w9 of the object 9 m in particular smaller than 800 mm.

A conveying width W22 is larger than the width W9 of the object. An exemplary width of the object 9 is in particular 800 mm. The conveying width W22 is in particular larger than 800 mm.

A width W43 of the lifting platform 43 is smaller than a width W25 of the accommodation space 25.

A width W43 of the lifting platform 43 is smaller than a width W9 of the object.

All widths as above refer to a dimension transverse to the direction D of travel in top view.

In contrast to the first rollers 12a, the second rollers cannot immediate contact the mobile drive, because the first end stop 35 prevents the mobile drive 30 from getting into an area under the second rollers 22b.

Instead, there is provided a drive line 27 transmitting drive power from the mobile drive located in the first drive section 11 to the second rollers.

In an embodiment the second roller 22b is permanently connected to a dedicated first roller 22a\* by the drive line 27. Here the drive line 27 may have a drive chain, a drive belt, a connection by gear wheels or the like. In case the mobile drive 30 is located approximate to the first end stop, the mobile drive 30 provides power via the dedicated first roller 22\* to the second rollers 22b. Distribution of drive power is illustrated by branched arrow F in FIG. 4.

There can be a clutch 28 provided in the drive line for selectively coupling and decoupling the second roller from the drive power. In particular the clutch can be adapted to selectively couple or decouple the second rollers to/from the first roller 22a\*.

In embodiment a presence sensor 29 is provided. The presence sensor 29 senses the presence of an object within the second conveying section 12 (FIG. 4). The operation of the clutch is made dependent on the output of the presence sensor 29. E.g. in case there is an object 9 detected in the second conveying section 12, the clutch 29 is closed to provide drive power to the second rollers 22b. In case there is no object detected in the second conveying section 12, the clutch can be opened to safe power (avoid loss of energy due to friction). There may be implemented other control algorithms implemented for controlling the operation of the clutch 28.

FIG. 2 shows an embodiment where a drive motor 22b\* is provided and adapted to provide mechanical drive power the second rollers 22b. The drive motor 22b\* may be a motor driven roller with internal drive motor. The drive motor 22b\* is temporarily electrically connected to the mobile drive 30 by connectors 26, 26. In particular, a frame side connector 36 is fixedly located at the end position 26 and a drive side connector 36 is located at the mobile drive; in particular when the mobile drive reaches the end position the two connectors get into a connected state, so that electric power form a battery 37 of the mobile drive can be provided as drive power F to the drive motor 22b\*. In this case it is not necessary to provide mechanical drive power from the mobile drive to the second rollers. The drive motor 22b\* is then drive connected to at least one other second roller 22.

The connectors 26. 36 can be used to provide electric power from the mobile drive to the clutch.

LIST OF REFERENCE SIGNS

1 Conveyor arrangement
8 floor
9 object to be conveyed (pallet)
11 first conveying section
12 second conveying section (interface section)
21 frame
22 rollers
24 track
25 accommodation space for liftable platform
26 frame side connector
27 drive line
28 clutch
29 presence sensor
30 mobile drive
31 main body
32 wheels
32M first drive motor
33 conveyor drive
33M second drive motor
35 first end stop
36 drive side connector
37 battery
40 automated guided vehicle
41 main body
42 wheels
42M vehicle drive motor
43 liftable platform
44 lifting device
45 second end stop
F drive power
L conveying surface of the second rollers
D direction of travel
W9 width of object to be conveyed
W22 width of conveying path
W25 width of accommodation space for liftable platform
W43 width of liftable platform
W9 width of object to be conveyed

What is claimed is:

1. A. conveyor arrangement (1), comprising:
a first conveying section (11) having first rollers (22a) on which an object (9) can be conveyed,
a second conveying section (12) having second rollers (22b) on which an object (9) can be conveyed,
wherein the second conveying section (12) is arranged adjacent to the first conveying section (11), so that the object (9) can be transferred between the conveying section (11, 12) by rolling along the rollers (22a, 22b),
a mobile drive (30), wherein the mobile drive is movable along different positions along the first conveying section (11) and the mobile drive is adapted to temporarily provide a drive power to a selected first roller (22a) depending on the position of the movable drive (30) in particular by immediate contact with the movable drive and the first roller (22a),
wherein the movable drive (30) is prevented to get into the second conveying section (12), in particular the movable drive (30) is prevented get in immediate contact with the second rollers (22b) for driving the second rollers (22b),
wherein the conveying arrangement comprises a drive line (27) for providing a drive power (F) at least indirectly from the movable drive (30) to the second rollers (22b) when the movable drive is located at a, in particular first end position (35), in the first conveying section adjacent to the second conveying section (12).

2. The conveyor arrangement (1) according to claim 1, wherein the second conveying section (12) is a terminal station where the object (9) is transferred to and/or from an external conveying vehicle (40),
wherein the external conveying vehicle (40) is in particular a fork lift, or an automated guided vehicle (40), and
in particular wherein the conveying vehicle (40) is a part of the conveyor arrangement (1).

3. The conveyor arrangement (1) according claim 2, where the second conveying section (12) comprises an accommodation space (25) adapted to accommodate the external vehicle (40), and
in particular wherein the accommodation space (25) is at least partially located below a conveying surface (L) spanned by the second conveyor rollers (22b).

4. The conveyor arrangement (1) according to claim 1, wherein the drive line (27) is adapted to provide a mechanical drive connection (F) between a dedicated roller (22a*) in the first conveying section (11) and at least a number of the second rollers (22b),
in particular wherein the dedicated roller (22a*) is one of the first rollers (22a) and/or where the mobile drive to be is positioned where the movable drive has direct contact to the dedicated roller (22a*).

5. The conveyor arrangement (1) according to claim 4, wherein the drive lines (27) comprise a clutch (28) for interrupting the mechanical drive connection (F).

6. , The conveyor arrangement (1) according to claim 1, further comprising a presence sensor (29) adapted to detect the presence of an object (9) in the second conveying section (12), and
wherein the functionality of the clutch or of the motor (22b*) is controlled in dependency of an output value of the presence sensor (29).

7. The conveyor arrangement (1) according to claim 5, wherein the clutch (28) is connectable to the mobile drive (30), further wherein in a connected state the movable drive is enabled to provide, in particular electric, power for operation of the clutch (28).

8. The conveyor arrangement (1) according to claim 1, further comprising an electric motor (22b*) adapted to provide a mechanical drive power to at least a number of the second rollers (22b), wherein the mobile drive (30) is adapted to provide electric power for operation of the electric motor (22b*).

9. The conveyor arrangement (1) according to claim 1, further comprising an external conveying vehicle (40),
wherein the second conveying section (12) and the vehicle (40) are adapted so that during loading or unloading the object (9) to and/or from the second conveying section (12) a lifting platform (43) for supporting the object is
at least temporarily placed under a conveying surface (L) spanned by the second conveyor rollers (22b), and/or
protruding through a conveying surface (L) spanned by the second conveyor rollers (22b).

10. A method for loading an object (9) from a vehicle to a first conveying section (10) of the conveyor arrangement according to claim 1, comprising the following steps:
driving the vehicle (40) into an accommodation space (25) within the second conveying section (12), in particular wherein a lifting platform (43) of the vehicle carries the object (9) above a conveying surface (L) spanned by the second conveyor rollers (22b);
releasing the object on the second roller (22b), in particular by lowering the lifting platform (43); and providing drive power by the movable drive (30) located in the first conveying section (11) to the second rollers (22*b*) located in the second conveying section (12), for transporting the object (9) from the second conveying section (12) to the first conveying section (11).

\* \* \* \* \*